United States Patent
Wentink et al.

(10) Patent No.: US 7,929,504 B2
(45) Date of Patent: Apr. 19, 2011

(54) SYSTEMS AND METHODS FOR THE CONNECTION AND REMOTE CONFIGURATION OF WIRELESS CLIENTS

(75) Inventors: Menzo Wentink, Utrecht (NL); Tobias Jeger, Maarssen (NL)

(73) Assignee: Xocyst Transfer AG L.L.C., Wilmington, DE (US)

( * ) Notice: Subject to any disclaimer, the term of this patent is extended or adjusted under 35 U.S.C. 154(b) by 410 days.

(21) Appl. No.: 11/314,143

(22) Filed: Dec. 21, 2005

(65) Prior Publication Data

US 2006/0153156 A1  Jul. 13, 2006

Related U.S. Application Data

(60) Provisional application No. 60/639,208, filed on Dec. 23, 2004.

(51) Int. Cl.
H04J 3/14 (2006.01)
(52) U.S. Cl. ...................... 370/338; 455/550.1
(58) Field of Classification Search .......... None
See application file for complete search history.

(56) References Cited

U.S. PATENT DOCUMENTS

| | | | |
|---|---|---|---|
| 6,850,502 B1 | 2/2005 | Kagan et al. | |
| 6,934,752 B1* | 8/2005 | Gubbi ..................... | 709/225 |
| 6,961,319 B2 | 11/2005 | Noaes | |
| 2003/0123405 A1 | 7/2003 | Del Prado et al. | |
| 2005/0025182 A1 | 2/2005 | Nazari | |
| 2005/0048997 A1* | 3/2005 | Grobler et al. .......... | 455/550.1 |
| 2005/0068900 A1 | 3/2005 | Stephens et al. | |
| 2006/0089964 A1 | 4/2006 | Pandey et al. | |
| 2006/0121929 A1 | 6/2006 | Cave et al. | |
| 2009/0042583 A1 | 2/2009 | Cave et al. | |

OTHER PUBLICATIONS

Roshan, et al., "802.11 Wireless LAN Fundamentals," Chapters 2 and 3, pp. 22-116.
Information Technology—Telecommunications and Information Exchange Between Systems—Local and Metropolitan Area Networks—Specific Requirements—Part 11: Wirelsss LAN Medium Access Control (MAC) and Physical Layer (PHY) Specifications, International Standard, ISO/IEC 8802-11, Cover page, pp. i-xvi and pp. 1-513.
International Preliminary Report on Patentability for PCT/US2005/046657, issued Jun. 26, 2007.
International Search Report and Written Opinion for PCT/US2005/046657, mailed Oct. 25, 2006.
International Search Report and Written Opinion for PCT/US2005/46210, mailed Sep. 18, 2006.
International Preliminary Report on Patentability for PCT/US2005/46210, issued Jun. 26, 2007.
Notice of Allowance for U.S. Appl. No. 11/314,149, mailed Mar. 8, 2010.
Non-final Office Action for U.S. Appl. No. 11/314,149, mailed Sep. 23, 2009.

(Continued)

Primary Examiner — Phuoc Doan

(57) ABSTRACT

Systems and methods for connection and remote configuration of wireless nodes communicating on a shared-communications channel. A master node includes a processor configured to generate a frame including configuration information designating network configuration parameters for configuring a remote wireless node for network communications. The master node transmits the frame over the shared communication channel to a slave node to be configured. The slave node includes a receiver for receiving the frame from the master node on the shared communication channel. The slave node includes a processor for configuring the wireless node to communicate according to the network configuration parameters designated by the configuration information in the frame.

41 Claims, 3 Drawing Sheets

OTHER PUBLICATIONS

Final Office Action for U.S. Appl. No. 11/314,149, mailed Jul. 21, 2009.

Non-final Office Action for U.S. Appl. No. 11/314,149, mailed Feb. 5, 2009.

Final Office Action for U.S. Appl. No. 11/314,149, mailed Oct. 17, 2008.

Non-final Office Action for U.S. Appl. No. 11/314,149, mailed Apr. 1, 2008.

Non-Final Office Action on U.S. Appl. No. 11/314,149 mailed Aug. 25, 2010.

Notice of Allowance on U.S. Appl. No. 11/314,149, mailed Jan. 20, 2011.

* cited by examiner

SYSTEMS AND METHODS FOR THE CONNECTION AND REMOTE CONFIGURATION OF WIRELESS CLIENTS

CROSS-REFERENCE TO RELATED APPLICATIONS

This application claims priority to and the benefit of U.S. Provisional Patent Application entitled "Client Connection Mechanism and Remote Configuration," assigned Ser. No. 60/639,208 and filed on Dec. 23, 2004, which is incorporated by reference in its entirety.

BACKGROUND

1. Field of the Invention

The present disclosure relates to telecommunications in general, and, more particularly, to a technique for connecting and remotely configuring wireless nodes.

2. Related Art

Wireless nodes are configured to communicate on a respective network by setting a number of network configuration parameters. The network configuration parameters may be preconfigured in the wireless node, or may be manually configured through a user interface on the device or through a non-wireless, direct hardware connection such as Ethernet, USB, or serial connections.

The 802.11 standard ("802.11") refers to a family of specifications developed by the Institute of Electrical and Electronics Engineers, Inc. (IEEE) for wireless local-area-network (LAN) technology. The IEEE accepted the original 802.11 specification in 1997 and has made several revisions since then. Accordingly, it is assumed that general information about the 802.11 standard are known to those skilled in the art. For example, a portion of this general information may be referenced in the book entitled "802.11 Wireless LAN Fundamentals," December 2003, by P. Roshan and J. Leary, which is incorporated by reference here in its entirety. Additionally, the 802.11 standard, ANSI/IEEE Std 802.11, 1999 Edition (R2003) entitled "Part 11: Wireless LAN Medium Access Control (MAC) and Physical Layer (PHY) Specifications" is also incorporated by reference herein.

In general, 802.11 specifies an over-the-air communications interface between wireless nodes. The communications interface may be between a wireless client and an access point or between two wireless clients, for example. Within the context of 802.11, the Basic Service Set is used to describe a collection of wireless nodes which may communicate together within an 802.11 WLAN (Wireless Local Area Network). The Basic Service Set may, or may not, include an access point. An access point may, for example, provide an intermediary through which other wireless nodes communicate, and the access point may further provide a connection onto a fixed distribution system, such as an Ethernet network. Two types of Basic Service Sets exist: an Independent Basic Service Set (IBSS) and an Infrastructure Basic Service Set (BSS).

A network set up as an IBSS may be referred to as an "ad-hoc network," while a network set up as an Infrastructure Basic Service Set may be referred to as an "infrastructure network." An infrastructure network contains an access point, which may then connect a number of wireless clients to a wired network infrastructure or to other wireless network clients. Unlike an infrastructure network, an ad-hoc network does not generally include an access point to connect wireless clients. Rather, the wireless connections in an ad-hoc network provide a direct connection between the wireless clients.

Whether connecting to an infrastructure network or an ad-hoc network, a wireless node identifies the particular network to connect to with a Basic Service Set Identifier (BSSID). Thus, every Basic Service Set, infrastructure or independent, has an identifying BSSID. The BSSID may, for example, be a 48 bit code used to identify a particular Basic Service Set within an area. In the case of an infrastructure network, the BSSID could, for example, be the MAC address of the access point. Associated with an Infrastructure network may also be an alphanumeric Service Set Identifier (SSID). For an ad-hoc network, the BSSID may be randomly generated by a wireless client, and may, for example, correspond to the MAC address of the wireless client that created the IBSS.

Like other wireless nodes, 802.11 wireless nodes may be configured locally at each wireless node such that they can connect to either an ad-hoc or infrastructure network. For example the wireless nodes may be supplied a BSSID, an encryption key, and a channel, which the wireless node uses to establish a connection. The wireless node is typically required to be physically present to input these configuration settings through a user interface. Additionally, some wireless nodes, such as cameras, phones, and printers, may not have a user interface at all, or the user interface may be difficult to use for entering the configuration information.

Other methods of configuring wireless nodes may use a non-wireless connection, such as Ethernet or Universal Serial Bus (USB). However, these configuration methods require additional hardware and circuitry that may not otherwise be necessary, and still require physical access to the wireless node.

SUMMARY

Embodiments of connection and remote configuration systems and methods are provided. One such embodiment is directed to a system for remotely configuring a wireless node. The system includes a wireless network having at least one shared communication channel. The system further includes a master node including a processor configured to generate a frame that includes configuration information. The configuration information designates network configuration parameters to remotely configure another wireless node for network communications. The master node includes a transmitter for sending the configuration information over the at least one shared communication channel. The system further includes a slave node. The slave node includes a receiver for receiving the frame including the configuration information from the master node on the at least one shared communication channel. The slave node further includes a processor configured to configure the slave node to communicate according to the network configuration parameters.

Another embodiment is directed to a method for remote configuration of a node. Such an embodiment includes transmitting configuration information from a first node to a second node over a wireless communication channel shared by the first and second nodes. The configuration information designates network configuration parameters to remotely configure the second node for network communications.

Another embodiment is directed to a method for remote configuration of a node. The method includes processing configuration information received at a second node from a first node, the configuration information transmitted to the second node over a wireless communication channel shared by the first and second nodes. The configuration information designates network configuration parameters to remotely configure the second node for network communications.

Yet another embodiment is directed to a master node. The master node includes a processor configured to transmit configuration information from the master node to a slave node over a wireless communication channel shared by the master and slave nodes. The configuration information designates network configuration parameters to remotely configure the slave node for network communications.

Yet another embodiment is directed to a slave node including a processor for processing configuration information wirelessly transmitted from a master node over a wireless communication channel shared by the slave node and the master node. The configuration information designating network configuration parameters to remotely configure the slave node for network communication.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Embodiments of connection and remote configuration systems and methods are provided. Those skilled in the art may also refer to the connection and remote configuration systems and/or methods as "mechanisms." The systems and methods may be used within a shared communications medium, such as, but not limited to, a wireless network. For example, the wireless network may conform to the IEEE 802.11 standard.

In summary, according to one embodiment, a number of wireless nodes may be remotely configured to connect to a communication network by sending a configuration frame from a master node to a node to be configured. The configuration frame is sent across a wireless communication channel shared by both the master node and the node to be configured. The channel may be a channel on the wireless network conforming to the IEEE 802.11 standards, for example. The wireless node to be configured (e.g. a slave node) may receive and recognize the transmitted configuration frame. The slave node may then configure itself according to information in the received configuration frame.

Among other uses, the described embodiments may, for example, be beneficial in remotely configuring wireless devices that do not have appropriate user interfaces for configuration. Such embodiments may be used to quickly configure remote devices without the need for physically accessing the wireless device. The connection and remote configuration systems or methods do not require a user interface on the wireless node to be configured. Furthermore, the node does not need to be physically accessed. As another potential benefit, the device to be configured does not need additional hardware circuitry, such as USB ports or serial ports, to support non-wireless connections for network configuration. Rather, the wireless nodes are configured through their wireless interface (which is inherently included in a wireless device).

For ease of illustration, the various embodiments of the present invention are discussed below in the context of IEEE 802.11-based wireless networking. However, those skilled in the art, using the teachings provided herein, may advantageously implement the disclosed embodiments in other wireless networks. Accordingly, reference to techniques and components specific to IEEE 802.11, such as an 802.11-specific frame format or a series of transmissions specific to 802.11, applies also to the equivalent technique or component in other wireless network standards unless otherwise noted. Moreover, various implementation details specified in the IEEE 802.11 standards (and other wireless standards) such as, for example, the transmission of an ACK frame to acknowledge receipt of a frame, are omitted for ease of discussion.

Figure 1:
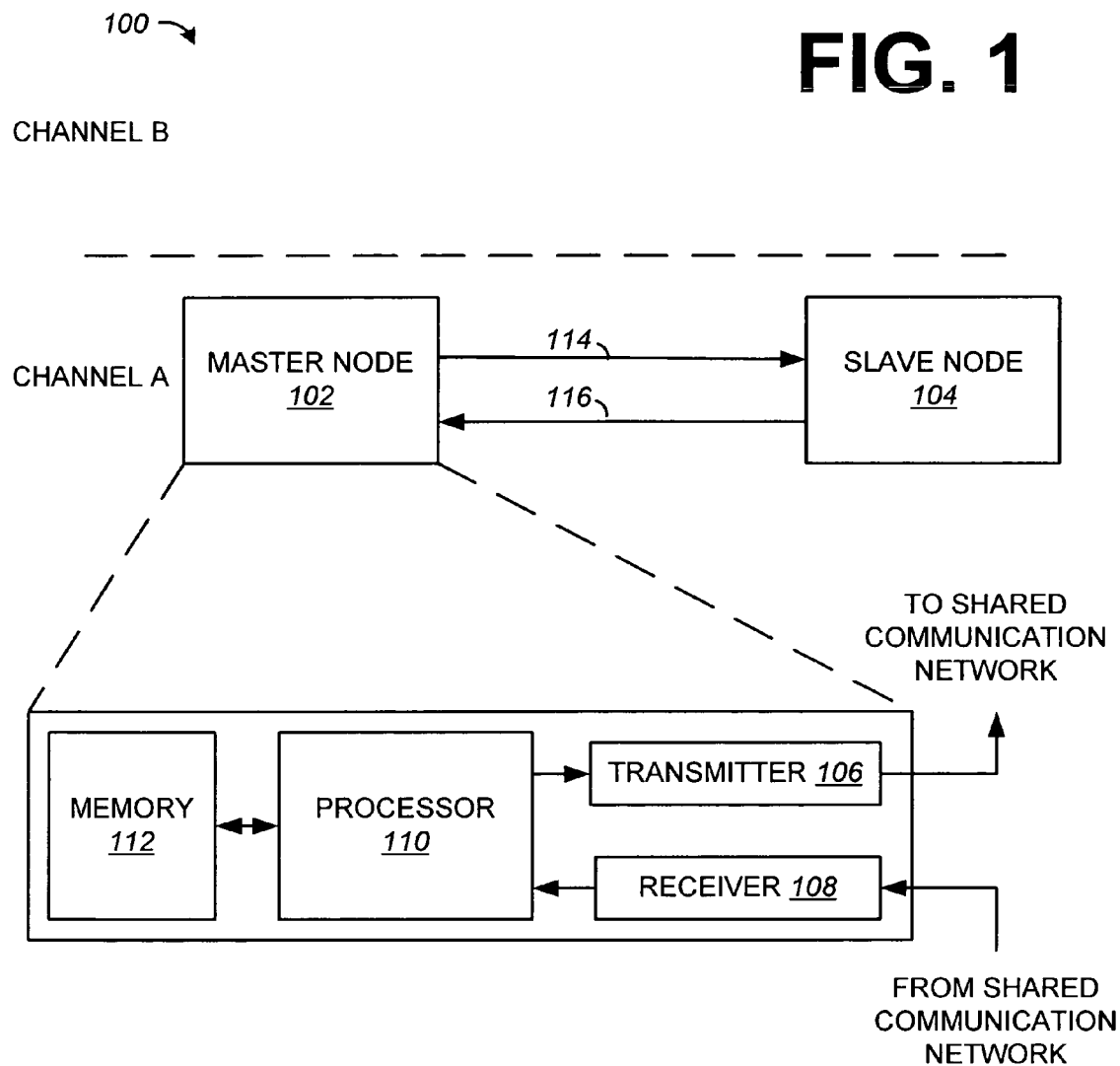
FIG. 1 depicts an embodiment of a network using an embodiment of a disclosed connection and remote configuration system in which both involved wireless nodes reside on the same base channel at the time of the remote configuration.

FIG. 1 depicts one embodiment of a network 100 using the disclosed connection and remote configuration system in which both involved wireless nodes reside on the same base channel at the time of the connection and remote configuration. The wireless nodes may include a master node 102 and slave node 104.

At least one of the wireless nodes may be, but is not limited to, a wireless enabled laptop computer, desktop computer, portable computer, camera, portable phone, cellular phone, printer, facsimile machine, scanner, infrared device, router, hub, set-top box, or television set. These, and other wireless nodes, may be IEEE 802.11 compliant devices that communicate using the 802.11 protocol.

As depicted in the inset of master node 102, wireless nodes may include a transmitter 106, a receiver 108, a processor 110, and a memory 112, in accordance with the illustrative embodiment of the present invention. Transmitter 106 comprises wireless interface circuitry that enables the wireless node to transmit data communications (e.g. frames, packets, etc.) onto a shared communications channel. These communications may be generated by the processor 110. It will be clear to those skilled in the art how to make and use transmitter 106.

Receiver 108 comprises the wireless interface circuitry that enables a wireless node to receive data communications (e.g. frames, packets, etc.) from the shared communications channel. When receiver 108 receives data from the shared communications network, it passes the data communications to a processor 110 for processing. It will be clear to those skilled in the art how to make and use receiver 108.

Processor 110 may be a general-purpose or special-purpose processor that is capable of performing the functionality described below and with respect to FIGS. 1 through 5. For example, processor 110 is capable of storing data into memory 112, retrieving data from memory 112, and of executing programs stored in memory 112. Memory 112 may accommodate input queues and output queues for incoming and outgoing data messages, respectively. It will be clear to those skilled in the art how to make and use processor 110 and memory 112.

Master node 102 may be the initiator of the connection and remote configuration, and slave node 104 may receive remote configuration information from the master node 102. It is assumed that master node 102 has already discovered slave node 104, and thus, is already aware of discovery information such as the MAC address of slave node 104. Other discovery information that master node 102 may be aware of is the device type, whether the client is operating in a powersave mode, the client's supported services, and the slave node's base channel, and/or any other information that may be useful for later establishing a connection between the master and slave nodes.

The discovery of slave node 104 may occur in a number of ways, and is outside the scope of this disclosure. However, it should be understood that discovery may be performed implicitly through a user interface or through a discovery system such as that described in co-pending, commonly-assigned, U.S. patent application Ser. No. 11/314,149, entitled "Systems and Methods for Device Discovery," filed concurrently with the present application and incorporated by reference here.

Each of master node 102 and slave node 104 may be any type of wireless node, including a wireless client or wireless access point. In the embodiment of network 100, master node 102 and slave node 104 are communicating on Channel A at the time of the connection and remote configuration. For example, Channel A may be their respective base channels. Although only two channels (Channel A and Channel B) are depicted for simplicity, the nodes 102 and 104 may be capable of communicating wirelessly on any number of channels. For example, 802.11 networks in North America may have 11 channels available for communication.

As will be described in more detail with respect to the flow diagram of FIG. 5, master node 102 may transmit a remote configuration frame 114 to slave node 104 for the purpose of remotely configuring slave node 104 to establish a connection with a designated Basic Service Set, which may be an infrastructure or ad-hoc network, for example. The designated Basic Service Set may be the same, or a different, Basic Service Set than the Basic Service Set that the master node may be associated with. Accordingly, a configuration frame includes configuration information that designates network configuration parameters for enabling the slave node to establish a network connection. For example, network configuration parameters may include the SSID, BSSID, channel, encryption key, passwords, tokens, etc used to connect to a Basic Service Set.

The configuration information may actually be the designated configuration parameters that can be directly used by the slave node to configure itself. However, the configuration information may also be information that can be used by the slave node to determine indirectly one or more of the designated network configuration parameters. For example, the master node may send configuration information that may be one or more codes, which could then be cross-referenced by the slave node (e.g. through a look-up-table, for example) to determine the corresponding designated configuration parameters.

Slave node 104 may, upon receiving and/or accepting the configuration designated in configuration frame 114, transmit a confirmation frame 116 to master node 102. Slave node 104 may accept the configuration by configuring itself according to the configuration frame, or by verifying the validity of the configuration information (e.g. by acknowledging that the configuration information can be used by the slave node to configure itself), for example. Confirmation frame 116 may provide master node 102 with an indication that slave node 104 has accepted the designated configuration. After slave node 104 transmits confirmation frame 116, slave node 104 may join the designated Basic Service Set using any additional configuration parameters specified in the configuration frame 114. Master node 102 may be configured to also connect to the designated Basic Service Set. Once both master node 102 and slave node 104 are both connected to the designated Basic Service Set, master node 102 and slave node 104 may communicate according to 802.11 standards.

Figure 2:
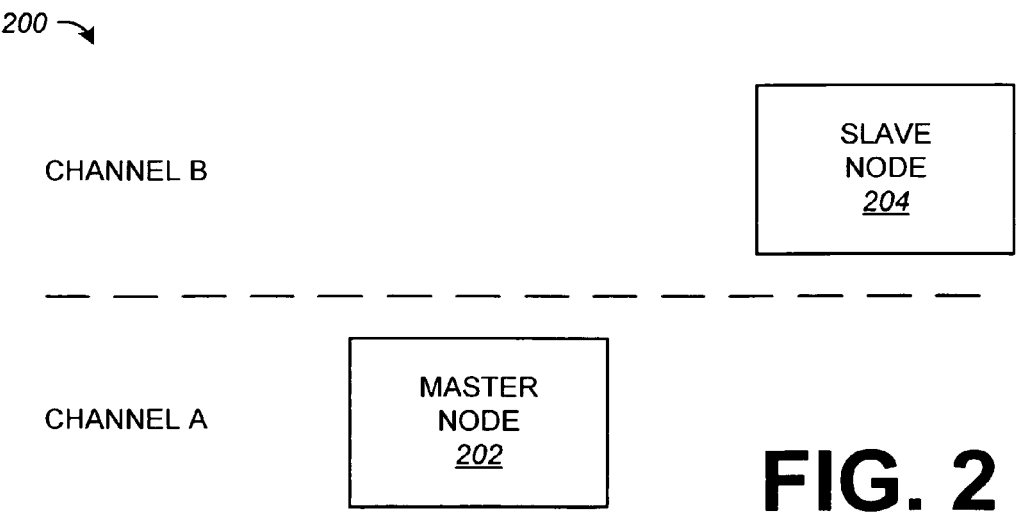
FIG. 2 depicts an embodiment of a wireless network in which a master node and slave node initially reside on different channels at the time of the connection and remote configuration process.

FIG. 2 depicts an embodiment of a wireless network 200 in which a master node 202 and slave node 204 initially reside on different channels at the time of the connection and remote configuration. In the embodiment of FIG. 2, master node 202 resides on Channel A, and slave node 204 resides on Channel B, which may be their respective base channels. Accordingly, master node 202 cannot communicate with slave node 204 without switching channels. For the purposes of this disclosure, it is assumed that master node 202 already knows the channel of slave node 204. However, it should be understood that the master node 202 may be provided with the slave node's 204 channel either through a user interface or other discovery system or method (e.g. these could be the same methods used to determine the slave node's MAC address).

Figure 3:
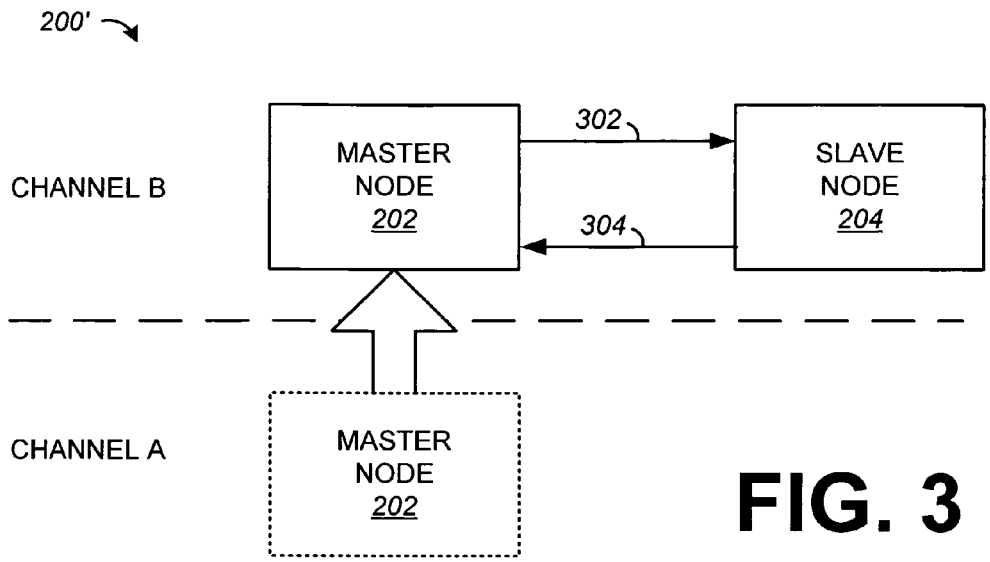
FIG. 3 depicts an embodiment of the network depicted in FIG. 2 after the master node has switched from communicating on a first channel to communicating on a second channel.

Once master node 202 determines the channel of slave node 204, master node 202 may switch to communicate on the channel of slave node 204. Accordingly, as depicted in FIG. 3, network 200' depicts master node 202 as having moved (i.e. switched) from communicating on Channel A to communicating on Channel B. Once master node 202 and slave node 204 are communicating on the same channel, the embodiments already described with respect to FIG. 1 may be performed to remotely configure slave node 204 and establish a connection between the slave node 204 and the designated Basic Service Set. For example, master node 202 is configured to send a configuration frame 302 to slave node 204. Upon receiving and accepting the configuration designated by the configuration information in the configuration frame, slave node 204 may be configured to send a confirmation frame 304.

Figure 4:
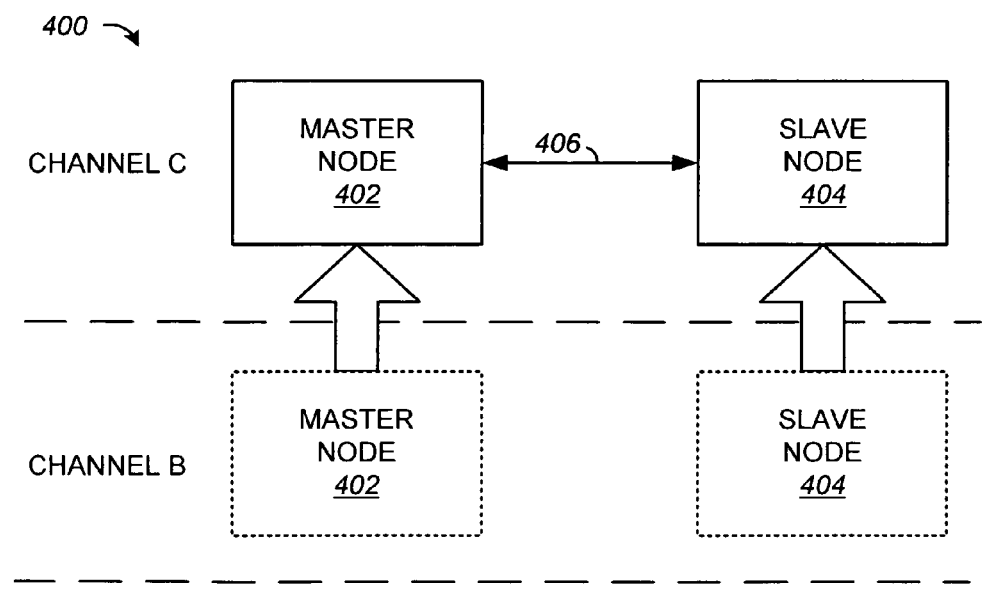
FIG. 4 depicts an embodiment of a wireless network in which a master node and slave node may both switch to an entirely different channel upon the slave node accepting the designated configuration sent by the master node.

FIG. 4 depicts an embodiment of a wireless network 400 in which a master node 402 and slave node 404 may switch to communicate on an entirely different channel upon the slave node accepting the designated configuration sent by the master node 402. That is, building on the embodiments of FIGS. 1 and 3, once a slave node 404 has transmitted the confirmation frame, the master node 402 may configure itself to communicate on the same Basic Service Set with the same configuration (e.g. encryption key, channel, etc.) as the slave node 404. Accordingly, master node 402 may change channels according to the channel designated in the configuration frame. Accordingly, in the embodiment of FIG. 4, slave node 404 has been designated to communicate on Channel C by the configuration frame transmitted by master node 402. Thus, once master node 402 receives the confirmation frame on Channel B, indicating that slave node 404 will accept the configuration (and thus switch to Channel C), master node 402 configures itself with the BSSID, key, and any other necessary network parameters such that master node 404 may communicate with slave node 404 on Channel C. Master node 402 may then switch to Channel C to establish a connection with the Basic Service Set having the BSSID, and may establish the communication connection 406 with slave node 404.

The embodiment of FIG. 4 illustrates that, if desired, the connection and remote configuration systems and methods may be used to designate a completely new Basic Service Set for the purpose of providing communication between a master node and a slave node. The new Basic Service Set may, for example, be an ad-hoc network in which both clients reside on the same channel during communications. The new Basic Service Set may, for example, be a temporary Basic Service Set set up for a limited time. The temporary Basic Service Set may be configured to use a new BSSID, new security key, and channel selected by the master node, and this configuration can be supplied in the configuration frame transmitted to the slave node. The new BSSID, security key, and/or channel, could be, for example, preconfigured or generated randomly by the master node.

Although the master node and slave node may be configured to communicate on the same channel after the slave is configured, this is not necessary. Rather, the master node may remotely configure the slave node to communicate according to any Basic Service Set configuration, and thus may designate that the slave node join a completely different Basic Service Set on a completely different channel than the master node. Although this may not result in the ability of the master and slave nodes to communicate, it illustrates that the remote configuration may be used to configure wireless nodes to attach to any Basic Service Set (rather than just the Basic Service Set of the master node).

Figure 5:
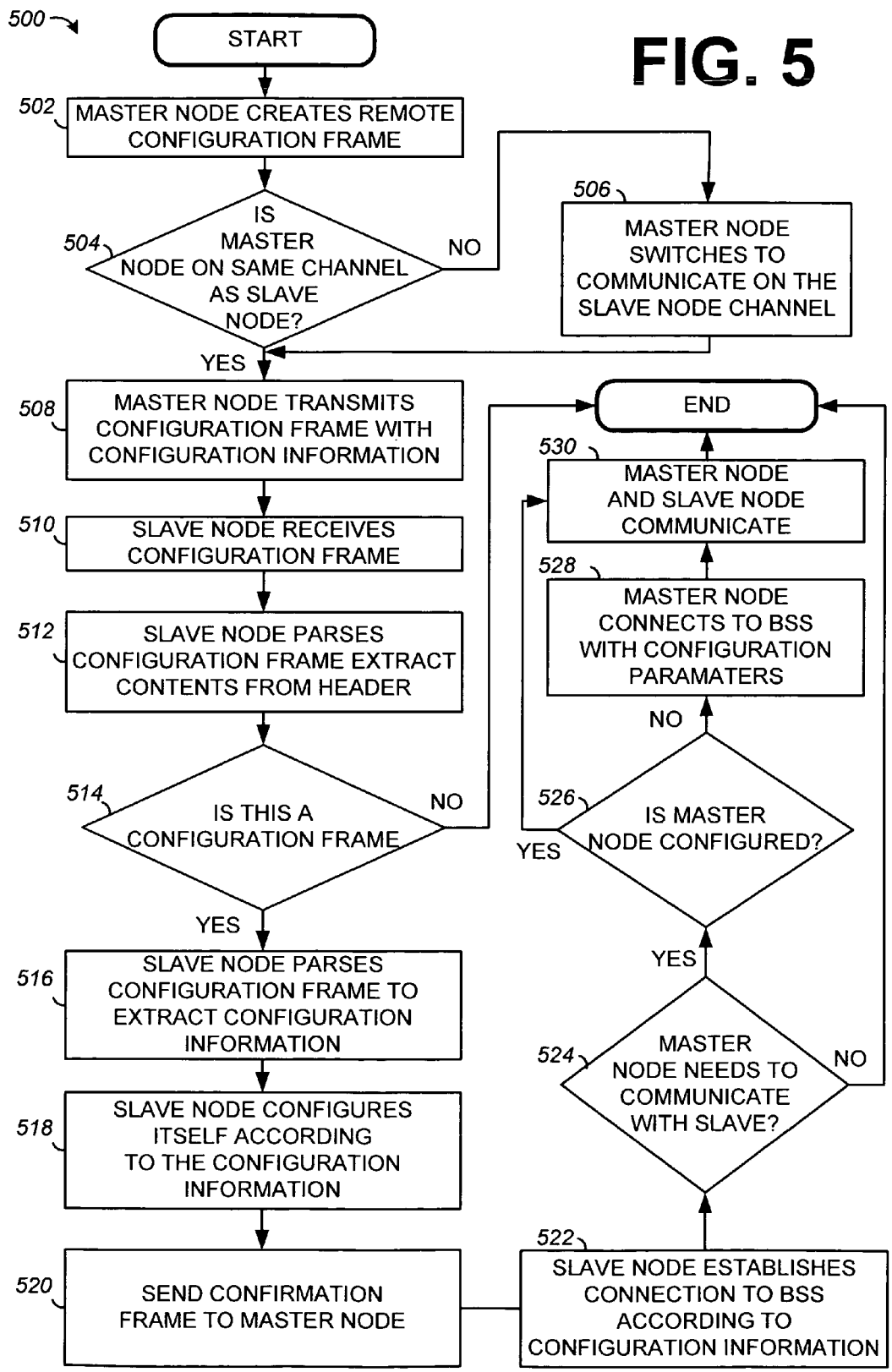
FIG. 5 depicts an exemplary flow diagram of a connection and remote configuration method embodiment that may be used with the networks of FIGS. 1-4.

Now that a general understanding of the potential environments for the disclosed connection and remote configuration systems and methods have been described, FIG. 5 depicts an exemplary flow diagram 500 of the connection and remote configuration method used to provide the connection and configuration described with respect to FIGS. 1-4. Specifically, at block 502, a master node constructs a remote configuration frame that includes configuration information to be transmitted to the slave node. The configuration information may be used by a slave node to establish a connection with a designated Basic Service Set. A remote configuration frame may be any known 802.11 frame (e.g. data frames, skip frames, etc.) or could be a proprietary frame format, for example. As discussed with respect to FIG. 1, the configuration information, for example, may designate network configuration parameters such as the SSID of the Basic Service Set to join, the BSSID of the Basic Service Set to join, security information, and possibly a channel that the slave node should use as its base channel. The security information, for example, may include authentication information and/or encryption information such as an encryption key of the Basic Service Set, a password, an unlocking token, or the encryption method used by the Basic Service Set. The password may, for example, be a shared password that may be used by the nodes to derive an encryption key.

In some embodiments, a slave node may be remotely configured only by certain authorized master nodes. For example, the slave node may be "locked" from remote configuration until the slave node receives an unlocking token from a master node, which may be transmitted inside the first configuration frame. The unlocking token may, for example, be thought of as a password that the slave node is preconfigured to recognize. Thus, the slave node may be configured to extract and recognize the unlocking token in a received configuration frame as being transmitted by an authorized master node. Upon recognizing the unlock token in the received configuration frame, the slave node may then extract the remaining configuration information from the configuration frame to determine the network configuration parameters. If the token is not recognized, the slave node may discard the frame. The token may also be used to identify the master node in further communications. Using a token to establish communications is especially useful when the encryption key for the configuration frame is determined using a security method without authentication.

At decision 504, the master node may determine whether the slave node currently resides on the same channel as the master node. For example, the master node may compare its current channel to the known channel of the slave node's. If the master node is not communicating on the same channel as the slave node (the NO condition), at block 506, the master node may switch to communicate on the channel as described with respect to FIG. 3.

Once the master node and the slave node are communicating on the same channel, (e.g. the YES condition), at block 508, the master node may instruct the slave node to connect to a Basic Service Set designated by the master node. Specifically, the master node may transmit a configuration frame to slave node using the known address of the slave node as the destination. The master node may transmit the configuration frame after waiting for the slave node's receive window.

In a secure wireless network, the configuration frame may be transmitted as an encrypted frame to the slave node. Configuration frame may be encrypted using any well known encryption algorithm, for example, with a key derived from a pre-shared password (e.g. pre-shared key (PSK)) or through a WiFi Protected Access Pre-shared Key (WPA-PSK), for example.

Accordingly, a shared key may be needed for the master node to encrypt, and the slave node to decrypt, the configuration frame. The shared key may already be preconfigured in the slave node and supplied to the master node (e.g. through a user interface). Additionally, methods for generating keys between nodes without authorization are known and also may be used. One key derivation algorithm, for example, may be based on the IEEE 802.11(i) standard.

Even if the received frame is able to be decrypted by the receiving node, the receiving node may be configured to ignore frames that are not specifically destined for the receiving node. That is, receiving nodes typically discard packets that do not have a matching destination address and/or SSID, for example. Accordingly, the configuration frame may include a frame identifier in the header of the MAC frame that signals to a receiving node that the configuration frame should not be discarded (and should be used for configuration).

For example, an 802.11 MAC frame may include a number of fields including, for example, the frame body (e.g. containing the data), error code information (e.g. cyclic redundancy check (CRC) information), as well as a header. The 802.11 MAC header specifies several information fields, including a frame control field, a duration ID, sequence control, and a number of address fields which may be referred to as the "Address 1," "Address 2," "Address 3," and "Address 4" fields.

The Address 1 field may contain the address of the receiving wireless node (destination) of the frame, and the Address 2 field may contain the address of the transmitting wireless node (source) of the frame. The Address 3 field may contain the BSSID. Wireless nodes may be configured to filter received frames based on the BSSID in the Address 3 field of the header. Thus, the wireless node may be configured to forward the received frame to the higher protocol layers (e.g. Open Systems Interconnection (OSI) layers) only if the BSSID matches the configured BSSID.

Accordingly, the configuration frame may include an identifier (herein a "remote configuration frame identifier"). Although the identifier could be located in other portions of the frame, according to some embodiments the configuration frame could include the identifier in the header location where the BSSID is normally found, such as Address 3 of the MAC header. The remote configuration frame identifier could be a company-specific multicast MAC address preconfigured in the slave node, for example. The receiving node is configured to recognize the remote configuration frame identifier as being associated with configuration frames. Thus, upon receipt of a frame having this remote configuration frame identifier, rather than discarding the frame (e.g. since the Address 3 field may not reference the BSSID to which the slave node belongs, if any), the processor in the slave node is configured to extract the configuration information from the configuration frame.

The remote configuration frame identifier may be configured next to the BSSID of the network the slave node is already connected with (if any), so that the slave node will always be able to receive configuration frames, irrespective of the connection state. That is, the slave node may be connected with a Basic Service Set with BSSID1, while the slave node also still filters configuration frames which are transmitted to BSSID2. Thus, BSSID2 is configured 'next to' BSSID1.

At block 510, the slave node may be configured to receive the configuration frame transmitted by the master node at block 506. At block 512, the slave node parses the received configuration frame to extract the header information from the configuration frame. Accordingly, the header information may include the remote configuration frame identifier.

At decision 514, the slave node determines whether the received frame is indeed a configuration frame that it recognizes. For example, the slave node may compare the remote configuration frame identifier to a stored configuration key. If the key does not match the remote configuration frame identifier in the configuration frame, the slave node determines that the frame is not a configuration frame (the NO condition). Accordingly, the slave node may perform other unrelated processing on the frame, or may discard the frame altogether. However, if the key does match the remote configuration frame identifier in the configuration frame, the slave node may determine that the frame is a configuration frame (the YES condition) and may proceed to extract the configuration information from the frame.

Thus, at block 516, once it is determined that the received frame is a configuration frame, the slave node may be configured to parse the body of the configuration frame to extract the configuration information from the configuration frame. At block 518, once the configuration information has been extracted, the slave node configures itself according to the configuration parameters designated by the configuration information in the configuration frame. For example, the slave node may set its SSID to a designated SSID of the Basic Service Set to join, set its encryption key to the designated encryption key, and set its channel to the designated channel. Of course, these are merely examples, and it should be understood that any other configuration parameters may be designated by the configuration information sent in the configuration frame, and the slave node may be configured to configure itself according to the other corresponding configuration parameters.

Upon accepting the configuration and establishing the connection at block 520, the slave node may respond with a confirmation frame, which serves as an acknowledgement of the acceptance of the configuration. The confirmation frame is addressed and transmitted to the master node by using the MAC address and other communication information that may be extracted from the header of the configuration frame. The confirmation frame may also include other information. In one embodiment, the confirmation frame may indicate that the configuration was denied. In such an embodiment, the confirmation frame may include an indication of the reason for the decline of the configuration (e.g. invalid parameters, etc.). For example, the reason may be supplied as a code which the master node may use to determine the cause of the decline of the configuration.

At block 522, once the confirmation frame is transmitted to the master node, a connection may then be established with the designated Basic Service Set using the network configuration parameters designated by the extracted configuration information. The systems and methods for establishing a connection to a Basic Service Set are outside of the scope of this disclosure. For example, for 802.11 networks, this method is defined by the 802.11 standard, and these methods would be the same as if the slave node were manually configured.

In some embodiments, the master node does not need to communicate with the slave node. Rather, the master node is used to remotely configure the slave node to communicate on a designated Basic Service Set, without further action. Thus, in this case, at decision 524, the NO condition ends the client connection and remote configuration.

In some embodiments, it may be desirable for the master node to establish a communication link with the slave node (decision 524, the YES condition). To establish the communication link with the slave node, the master node may join the Basic Service Set that the slave node has joined. Thus, at decision 526, the master node compares its existing communication parameters to the communication parameters designated in the configuration information sent to the slave node. If the master node is already configured according to these parameters such that it can already communicate with the slave node (the YES condition), the master node may begin communication at block 530. However, if the master node is not configured such that it can communicate with the slave node (the NO condition), at block 528, the master node configures itself with the necessary network configuration parameters (BSSID, key, channel, etc.) and connects to the Basic Service Set using these configuration parameters. This may, for example, require changing channels to the slave node's channel, as described with respect to FIGS. 3 and 4.

Thus, it should be understood that, in some embodiments, the configuration supplied to the slave node by the master node in the configuration frame may, for example, enable the slave node to join and communicate on the Basic Service Set that the master node currently belongs (if any). Likewise, in some embodiments, the configuration enables the slave node to join and communicate on a different Basic Service Set than the master node.

Further, in some cases it may be desirable to instruct the slave node to join a new, temporary Basic Service Set for the purpose of a temporary connection with a master node, or other wireless nodes. Accordingly, the client connection and configuration systems and methods may enable wireless nodes (e.g. clients) to connect with each other through a Temporary Basic Service Set (TBSS). The TBSS may be thought of as a temporary Basic Service Set, which may have a SSID, a BSSID, and a session key which may, for example, be preconfigured or randomly generated by the master node.

When embodiments of the described connection and remote configuration systems and methods are used to configure an infrastructure network, a configuration frame can also be transmitted by an access point to instruct other wireless nodes, such as wireless clients, to join the infrastructure network of the access point. The access point may also instruct the wireless clients to join a Basic Service Set other than the Basic Service Set the access point resides within.

This may, for example, be used to manage network congestion (e.g. by shifting wireless clients to balance network traffic).

However, when the master node is an access point, there is some risk of losing packets communicated to the access point by other wireless nodes if the access point is required to switch to the base channel of a slave node to be remotely configured. However, one embodiment may use a Network Allocation Vector (NAV) to prevent the non-receipt of data. Specifically, 802.11 wireless nodes may use a virtual carrier sense that updates a NAV. The NAV duration, for example, may be set by adding a non-zero duration inside the MAC header. Stations that receive the MAC header with the duration will assume that the network is busy for this period of time (and thus, will not transmit during this time). Accordingly, in one embodiment, the access point may set a NAV on its base channel before switching to the base channel of the client to be configured. That is, the access point may broadcast a frame designating a NAV duration such that receiving nodes on the base channel are instructed not to transmit frames to the access point during this NAV duration. The access point may then change channels to perform the remote configuration of the slave node during this NAV duration. Accordingly, the access point prevents the loss of packets while the access point switches off its base channel to communicate with the slave node to be configured.

According to yet another embodiment in which the master node is an access point, the access point may prevent data loss by waiting until the access point receives, for example, a probe request frame from the slave node before transmitting a configuration frame to the slave node. That is, as defined by the 802.11 standard, a probe request frame may be periodically broadcast by wireless nodes (e.g. for the purpose of announcing themselves to access points). The probe requests are transmitted by the wireless nodes during an active scan of each channel. Effectively, rather than switching to the channel of the slave node, the access point waits for the slave node to switch to the access point's channel and send the access point a probe request frame. Upon the access point's receipt of the probe request frame, a configuration frame is transmitted to the slave node from the access point. Accordingly, the slave node is instructed to configure itself according to the network configuration parameters designated by the configuration information contained within the configuration frame. Waiting for a probe request may result in a longer delay than an embodiment using a NAV. However, one potential advantage is that the access point is not required to leave the access point's base channel. Thus, communications between wireless nodes and the access point are not disturbed.

In addition to being useful for configuring wireless clients, the connection and remote configuration embodiments may also be used to instruct an access point to start an infrastructure network. For example the systems and methods may be used when installing a new access point, if an access point loses its configuration, or if it is desired to switch the access point to communicate on a new Basic Service Set. Generally, in this scenario, the access point is the slave node, and any other wireless node may be the master node.

It should be emphasized that many variations and modifications may be made to the above-described embodiments. All such modifications and variations are intended to be included herein within the scope of this disclosure and protected by the following claims.

At least the following is claimed:

1. A method for remote configuration of a node comprising:
    generating network configuration information at a first wireless node capable of configuring a different second wireless node for network communications;
    embedding a network identifier of a network for the second wireless node to join within the network configuration information;
    generating a frame having a destination address of the second wireless node and including the network configuration information and an identifier to identify the frame as a network configuration frame;
    the first wireless node determining a channel that the second wireless node is residing on; and
    transmitting the frame from the first wireless node to the second wireless node on the determined channel, the network configuration information designating network configuration parameters to remotely configure the second wireless node for the network communications.

2. The method of claim 1, wherein embedding a network identifier includes embedding a basic service set identifier (BSSID) or a service set identifier (SSID) in the network configuration information, and the method further includes embedding at least one of security information or channel information in the network configuration information.

3. The method of claim 1, wherein the first wireless node resides on a base channel, the determined channel being different than the base channel, and the first wireless node switching from the base channel to the determined channel prior to transmitting the frame to the second wireless node.

4. The method of claim 3, wherein the first wireless node broadcasts a network allocation vector (NAV) on the base channel prior to switching from the base channel to the determined channel, the NAV designating a duration of time for nodes receiving the NAV not to transmit data to the first wireless node and transmits the network configuration information to the second wireless node, on the determined channel, during the designated duration of time.

5. The method of claim 1, wherein the first wireless node resides on a base channel, and responsive to receiving a probe request from the second wireless node on the base channel, transmits the network configuration information to the second wireless node at a time when the second wireless node resides on the base channel of the access point.

6. The method of claim 1, further comprising:
    receiving a confirmation in response to the second wireless node accepting the network configuration information, the confirmation indicating that the designated network configuration parameters have been accepted by the second wireless node; and
    establishing communications between the first wireless node and the second wireless node on a channel designated by the network configuration information, after receiving the confirmation.

7. The method of claim 6, wherein communications between the first wireless node and the second wireless node are established on a channel different from the channel used to exchange network configuration information.

8. The method of claim 1, further comprising:
    transmitting the network configuration information in a network configuration frame, the network configuration frame recognized by the second wireless node as an instruction capable of configuring the second wireless node for network communications according to the network configuration information.

9. The method of claim 8, wherein the first wireless node generates the frame by including a remote network configuration frame identifier in the frame, the remote configuration frame identifier specifying that the frame is a network configuration frame.

10. The method of claim 9, wherein the second wireless node, responsive to recognizing the remote network configuration frame identifier in a received frame, extracts the network configuration information from the network configuration frame to determine the network configuration parameters.

11. The method of claim 1, wherein the frame is a medium access control (MAC) frame and a header portion of the frame includes the identifier to identify the MAC frame as a network configuration frame.

12. A method for remote configuration of a wireless node comprising:
receiving a frame having a source address of a first wireless node and a destination address of a second wireless node at the second wireless node via a wireless communication-channel shared by the first and second wireless nodes;
the second wireless node processing information embedded within the frame and comparing it to a stored configuration key, and responsive to finding a match, identifying the frame as a network configuration frame; and
the second wireless node processing network configuration information embedded within the frame the network configuration information designating network configuration parameters to remotely configure the second wireless node for network communications, the network configuration information including a network identifier of a network for the second wireless node to join.

13. The method of claim 12, further including:
the second wireless node accepting the network configuration information and configuring the second wireless node according to the designated network configuration parameters; and
the second wireless node transmitting a confirmation to the first wireless node indicating that the designated network configuration parameters have been accepted by the second wireless node.

14. The method of claim 13, further comprising:
the second wireless node establishing communications with the first wireless node on a channel designated by the network configuration information.

15. The method of claim 14, wherein communications between the first wireless node and the second wireless node are established on a channel different from the channel used to exchange network configuration information.

16. The method of claim 12, wherein the frame is a medium access control (MAC) frame and a header portion of the frame includes the identifier to identify the MAC frame as a network configuration frame.

17. A system for remotely configuring a wireless node, the system comprising:
a master wireless node comprising:
a processor configured to generate network configuration information capable of configuring a different slave wireless node for network communications, determine a channel that the slave wireless node is residing on, and generate a frame having a destination address of a slave wireless node and including the network configuration information designating network configuration parameters to remotely configure the slave wireless node for the network communications, and the frame further including an identifier to identify the frame as a network configuration frame, the network configuration information including at least a network identifier of a network for the slave wireless node to join; and
a transmitter configured to send the frame on the determined channel to the slave wireless node; and
the slave wireless node comprising:
a receiver configured to receive the frame including the network configuration information from the master wireless node on the determined channel; and
a processor configured to process the identifier and identify the frame as a network configuration frame, to configure the slave wireless node to join the network corresponding to the network identifier included in the frame, and to communicate according to the network configuration parameters.

18. The system of claim 17, wherein the processor of the slave wireless node is configured to:
compare the network configuration frame identifier to a stored configuration key, and responsive to finding a match, identify the frame as a network configuration frame.

19. The system of claim 17, wherein the frame is a medium access control (MAC) frame and a header portion of the frame includes the identifier to identify the MAC frame as a network configuration frame.

20. The system of claim 17, wherein the master wireless node resides on a base channel, the determined channel being different than the base channel, and the processor of the master wireless node is further configured to cause the transmitter to switch from the base channel to the determined channel prior to the transmitter transmitting the frame to the slave wireless node.

21. The system of claim 20, wherein the processor of the master wireless node is further configured to cause the transmitter to broadcast a network allocation vector (NAV) on the base channel prior to switching from the base channel to the determined channel, the NAV designating a duration of time for nodes receiving the NAV not to transmit data to the master wireless node, and wherein the frame is caused to be transmitted to the second wireless node, on the determined channel, during the designated duration of time.

22. The system of claim 17, wherein the master wireless node resides on a base channel, and the processor of the master wireless node is further configured to, responsive to receiving a probe request from the slave wireless node on the base channel, transmit the network configuration information to the slave wireless node at a time when the slave wireless node is residing on the base channel of the master wireless node.

23. A master wireless node comprising:
a transmitter;
a processor configured to generate network configuration information capable of configuring a different slave wireless node for network communications, determine a base channel of the slave wireless node, and generate a network configuration frame for transmission to the slave wireless node on the base channel of the slave wireless node, the frame including a destination address of the slave wireless node, a remote network configuration frame identifier to identify the frame as a network configuration frame, and network configuration information, the network configuration information designating network configuration parameters to remotely configure the slave wireless node for the network communications and including at least a network identifier of a network for the slave wireless node to join; and
the processor further configured to cause the transmitter to transmit the frame from the master wireless node to the slave wireless node over the determined based channel of the slave wireless node.

24. The master wireless node of claim 23, wherein the network configuration information includes:
a basic service set identifier (BSSID) or a service set identifier (SSID); and
at least one of security information and channel information.

25. The master wireless node according to claim 23, wherein the frame is a medium access control (MAC) frame and a header portion of the frame includes the identifier to identify the MAC frame as a network configuration frame.

26. The master wireless node of claim 23, wherein the master wireless node resides on a base channel, the determined channel being different than the base channel, and the processor of the master wireless node is further configured to cause the transmitter to switch from the base channel to the determined channel prior to causing the transmitter to transmit the frame to the slave wireless node.

27. The master wireless node of claim 26, wherein the processor of the master wireless node is further configured to cause the transmitter to broadcast a network allocation vector (NAV) on the base channel prior to switching from the base channel to the determined channel, the NAV designating a duration of time for nodes receiving the NAV not to transmit data to the master wireless node, and wherein the frame is caused to be transmitted to the second wireless node, on the determined channel, during the designated duration of time.

28. The master wireless node of claim 23, wherein the master wireless node resides on a base channel, and the processor is further configured to, responsive to receiving a probe request from the slave wireless node on the base channel, transmit the network configuration information to the slave wireless node at a time when the slave wireless node is residing on the base channel of the master wireless node.

29. A slave wireless node comprising:
a processor configured to process a received frame having a destination address of the slave wireless node and to compare a remote network configuration frame identifier in the received frame to a stored configuration key, and responsive to finding a match, the processor configured to extract network configuration information from the network configuration frame to determine network configuration parameters to remotely configure the slave wireless node for network communications, the network configuration information including at least a network identifier of a network for the second wireless node to join.

30. The slave wireless node of claim 29, wherein the processor is further configured to transmit a confirmation to the master wireless node in response to extracting network configuration information from the network configuration frame, the confirmation indicating that the designated network configuration parameters have been accepted by the slave wireless node.

31. The slave wireless node according to claim 29, wherein the frame is a medium access control (MAC) frame and a header portion of the frame includes the identifier to identify the MAC frame as a network configuration frame.

32. A first wireless node for remote configuration of a second wireless node comprising:
means for generating a frame at a first wireless node for configuring a different second wireless node for network communications, the frame including network configuration information, a destination network address of the second wireless node, and an identifier to identify the frame as a network configuration frame, the network configuration information including at least a network identifier of a network for the second wireless node to join;
means for determining a channel that the second wireless node is residing on; and
means for transmitting the frame from the first wireless node to the second wireless node on the determined channel, the network configuration information designating network configuration parameters to remotely configure the second wireless node for the network communications.

33. The first wireless node of claim 32, further comprising:
means for embedding a network identifier of a network for the second wireless node to join within the network configuration information.

34. The first wireless node of claim 33, wherein the means for embedding a network identifier includes means for embedding a basic service set identifier (BSSID) or a Service Set Identifier (SSID) in the network configuration information, and the system further includes:
means for embedding at least one of security information or channel information in the network configuration information.

35. The first wireless node of claim 32, wherein the first wireless node that resides on a base channel, the determined channel being different than the base channel, and the means for transmitting including means for switching from the base channel to the determined channel prior to transmitting the frame to the second wireless node.

36. The first wireless node of claim 35, wherein the first wireless node broadcasts a network allocation vector (NAV) on the base channel prior to switching to the determined channel, the NAV designating a duration of time for nodes receiving the NAV not to transmit data to the first wireless node and transmits the network configuration information to the second wireless node, on the determined channel, during the designated duration of time.

37. The first wireless node of claim 32, wherein the first wireless node resides on a base channel, and the first wireless node further comprises:
means for receiving a probe request from the second wireless node on the base channel; and
means for transmitting the network configuration information to the second wireless node at a time when the second wireless node is residing on the base channel of the first wireless node in response to receiving the probe request.

38. The first wireless node according to claim 32, wherein the frame is a medium access control (MAC) frame and a header portion of the frame includes the identifier to identify the MAC frame as a network configuration frame.

39. A tangible non-transitory computer-readable medium having instructions stored thereon, the instructions comprising:
instructions to generate network configuration information, wherein a network identifier is embedded in the network configuration information, and wherein the network configuration information includes network configuration parameters to remotely configure a node for network communications;
instructions to generate a frame having a destination address of the node, wherein the frame includes the network configuration information and an identifier to identify the frame as a network configuration frame;
instructions to determine a channel that the node resides on;

instructions to transmit the frame to the node on the determined channel; and instructions to receive a confirmation in response to the node accepting the network configuration information, wherein the confirmation indicates that the network configuration parameters have been accepted by the node.

40. The tangible non-transitory computer-readable medium of claim 39, wherein a basic service set identifier (BSSID) or a service set identifier (SSID) is also embedded in the network configuration information.

41. The tangible non-transitory computer-readable medium of claim 39, further comprising instructions to embed at least one of security information or channel information in the network configuration information.

* * * * *

UNITED STATES PATENT AND TRADEMARK OFFICE
CERTIFICATE OF CORRECTION

PATENT NO.       : 7,929,504 B2                                      Page 1 of 1
APPLICATION NO.  : 11/314143
DATED            : April 19, 2011
INVENTOR(S)      : Wentink et al.

It is certified that error appears in the above-identified patent and that said Letters Patent is hereby corrected as shown below:

Title page, item (56), under "Other Publications", in Column 2, Line 5, delete "Wirelsss" and insert
-- Wireless --.

Signed and Sealed this
Ninth Day of August, 2011

David J. Kappos
*Director of the United States Patent and Trademark Office*